(12) United States Patent
Puigardeu Aramendia et al.

(10) Patent No.: US 12,496,779 B2
(45) Date of Patent: Dec. 16, 2025

(54) THREE-DIMENSIONAL ADDITIONAL OBJECT GENERATION

(71) Applicant: Peridot Print LLC, Palo Alto, CA (US)

(72) Inventors: Sergio Puigardeu Aramendia, Sant Cugat del Valles (ES); Michel Georges Encrenaz, Sant Cugat del Valles (ES); Marc Garcia Grau, Sant Cugat del Valles (ES); Sergi Culubret I Cortada, Sant Cugat del Valles (ES)

(73) Assignee: PERIDOT PRINT LLC, Palo Alto, CA (US)

( * ) Notice: Subject to any disclaimer, the term of this patent is extended or adjusted under 35 U.S.C. 154(b) by 91 days.

(21) Appl. No.: 18/701,225

(22) PCT Filed: Oct. 25, 2021

(86) PCT No.: PCT/US2021/056436
§ 371 (c)(1),
(2) Date: Apr. 13, 2024

(87) PCT Pub. No.: WO2023/075745
PCT Pub. Date: May 4, 2023

(65) Prior Publication Data
US 2025/0001691 A1    Jan. 2, 2025

(51) Int. Cl.
*B29C 64/364*    (2017.01)
*B22F 10/47*    (2021.01)
(Continued)

(52) U.S. Cl.
CPC ............ *B29C 64/364* (2017.08); *B22F 10/47* (2021.01); *B22F 10/80* (2021.01); *B22F 12/70* (2021.01);
(Continued)

(58) Field of Classification Search
None
See application file for complete search history.

(56) References Cited

U.S. PATENT DOCUMENTS

2016/0221264 A1    8/2016    Doherty et al.
2017/0203514 A1    7/2017    Mccoy et al.
(Continued)

FOREIGN PATENT DOCUMENTS

WO    2008/086822 A1    7/2008
WO    WO-2019002563 A2 *    1/2019    ........... B23K 26/342
(Continued)

*Primary Examiner* — Yung-Sheng M Tsui
(74) *Attorney, Agent, or Firm* — Michael Dryja

(57) ABSTRACT

According to one aspect, there is provided a method of automatically creating sacrificial parts to be printed in the three-dimensional printer. The method comprises obtaining object model data relating to a three-dimensional object to be printed in a build chamber by a three-dimensional printer. The method determines whether the object will likely be deformed during a curing process of contents of the build chamber, wherein the curing process comprises heating of the contents of the build chamber and generating a gas flow. If the determination is affirmative, the method includes generating updated object model data including additional object to be printed in proximity to the object, the additional object to prevent deformation of the object due to the gas flow applied during the curing process.

17 Claims, 7 Drawing Sheets

(51) Int. Cl.
*B22F 10/80* (2021.01)
*B22F 12/70* (2021.01)
*B28B 1/00* (2006.01)
*B28B 17/00* (2006.01)
*B28B 17/04* (2006.01)
*B29C 64/165* (2017.01)
*B29C 64/386* (2017.01)
*B33Y 10/00* (2015.01)
*B33Y 50/00* (2015.01)
*G06F 30/17* (2020.01)

(52) U.S. Cl.
CPC .......... *B28B 1/001* (2013.01); *B28B 17/0081* (2013.01); *B28B 17/04* (2013.01); *B29C 64/165* (2017.08); *B29C 64/386* (2017.08); *B33Y 10/00* (2014.12); *B33Y 50/00* (2014.12); *G06F 30/17* (2020.01)

(56) References Cited

U.S. PATENT DOCUMENTS

2017/0297100 A1    10/2017   Gibson et al.
2018/0154580 A1*   6/2018   Mark ........................ B22F 3/24
2020/0114422 A1*   4/2020   Mark ........................ B22F 1/10

FOREIGN PATENT DOCUMENTS

WO         2019/236074 A1    12/2019
WO    WO-2024014387 A1 *   1/2024      ............. B33Y 50/02

\* cited by examiner

THREE-DIMENSIONAL ADDITIONAL OBJECT GENERATION

BACKGROUND

Additive manufacturing techniques are capable of building three-dimensional, or 3D, objects with complex geometries. One technique forms successive layers of a powdered or granular build material on a build platform in a build chamber, and selectively applies a print agent which may be a thermally curable binder agent on regions of each layer that are to form part of the 3D object being generated. The thermally curable binder agent is thermally cured in a curing process to form a sufficiently strong green part that may be removed from the build chamber, cleaned up, and then sintered in a sintering furnace to form the final 3D object.

DETAILED DESCRIPTION

Figure 1:
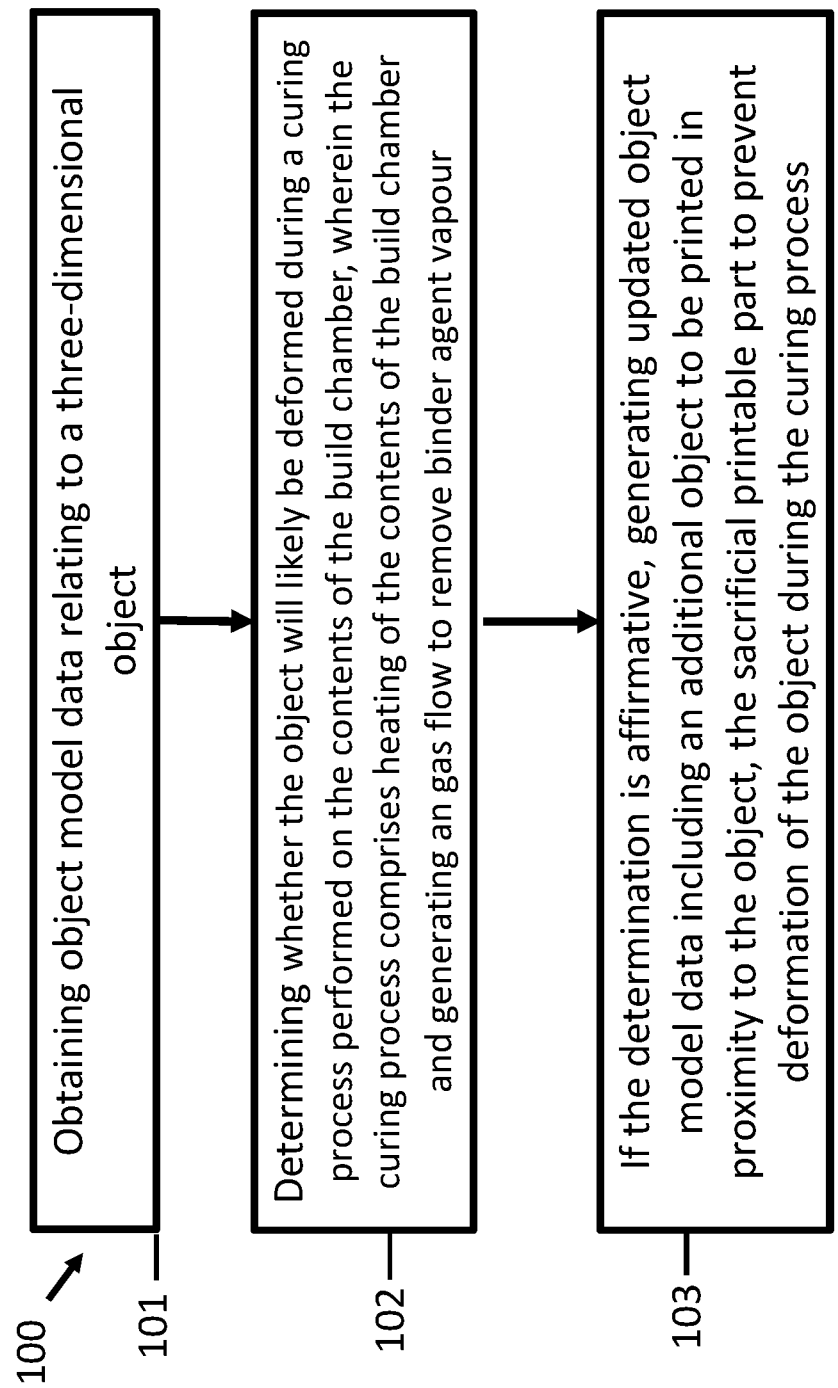
FIG. 1 is an example of a method that may be used to generate updated object model data including an additional object to be printed in proximity to an object.

Some powder-based 3D printing techniques use a liquid print agent, such as a binder agent, to form a so-called green part by selectively applying the liquid binder agent, in accordance with an object model, on successively formed layers of a build material, such as a metal, ceramic, or plastic powder, in a build chamber, to form a build bed. Subsequently, the binder agent may be cured.

Curing of the binder agent may create a relatively weakly bound matrix of build material particles, in a form based on the object model, bound together by the cured binder agent. When a 3D object is generated in this manner, the 3D object is commonly referred to as a green part. A green part generated with powdered metal or ceramic build material, for example, has to be sintered in a sintering furnace to transform the green part into a highly dense final object.

In one example, the curing process is performed by heating the contents of a build bed to a suitable temperature for a suitable period of time. During the curing process, solvents in the binder agent are extracted from the build bed using a gas flow. In one example, the gas may be air. The build bed may comprise a printed structure that is formed atop a set of layers of powder on which no binder agent has been applied. However, the curing gas flow may cause compaction of the underlying powder and hence this may cause the printed structure to deform.

Examples described herein provide a system and method of analysing a 3D model of an object to be 3D printed, prior to building the object, to determine portions of the object that will likely be deformed during a curing phase due to an gas flow such as airflow being applied to the build bed containing the object during a curing process. Upon determination that a portion of the object will likely be subject to deformation, one or multiple additional (or sacrificial) object models may be automatically generated that are to be generated in a predetermined location in the build bed relative to the 3D object. In an example, multiple object models may be combined and their relative locations specified in a 3D print job file such as a 3MF type file. In other examples, multiple objects may be defined within a single object model. The print job file may include instructions to print the generated object models in a 3D printing apparatus and may include modified object model data that includes one or multiple additional object models. During printing based on the printing data including the modified object model data, binder agent applied to the sacrificial part assists with the bond of build material particles in build material of the sacrificial part, which in turn can provide additional mechanical support to the object. This, in turn, helps reduce or prevent deformation of the object as a result of the curing process. The use of additional object parts in this way has been shown to advantageously reduce quality issues by reducing deformation whilst the object is embedded in the build bed and has been subject to a curing process that includes the application of airflow. In an example, this can be achieved without modifying or adapting the airflow.

The sacrificial parts are dummy parts that are separate to the intended object to be printed in the build bed. A sacrificial part may be an additional object that is generated by an object modelling system and that was not defined by the user and that has a use exclusively during the intended object generation phase. However, both the sacrificial parts and the desired object can be designed as a 3D model in a pre-printing application in an object modelling system or in a 3D printing apparatus prior to building in a 3D printing apparatus. The object modelling system can, in an example, enable assessment of an object model via a computer simulation. The pre-printing application may be under the control of a controller or processor that carries out programmed instructions. The sacrificial parts may be printed in specific regions of the build bed to avoid damage to parts, such as delicate parts, of the intended object and in proximity to the parts.

In the curing process, the whole build bed that may contain build powder is heated and binder agent within the build bed is cured to form the desired 3D object. A gas flow which may in one example be airflow is applied through the build bed during the curing process to remove binder agent solvent vapour. It has been found that the airflow characteristics through a build bed may vary. The powder on which binder agent has been applied may be less porous than powder on which no agent is applied due to the wetting effect of the liquid print agent on the dry powder particle. A layer density of a build bed may vary across the layer depending on where there is a printed area where binder agent may have been applied compared to non-printed areas of the build bed where binder agent has not been applied with it being more difficult for air to flow in printed areas of the build bed.

A specific region in the build bed that a sacrificial part is to be printed can be determined before printing such that deformation of the intended object due to airflow is avoided or prevented in the curing process. The extent of the prevention of deformation may be the reduction in the deformation compared to if a sacrificial part were not present or when the deformation is within predetermined acceptable limits. The predetermined acceptable limits may be vary and in an example may be defined such that deformation is acceptable to an extent that it does not cause breakage of the object. In another example, the limits may be within tighter tolerances to prevent any deformation. The determination of the specific region that a sacrificial part is to be printed may be based on the direction of the airflow within a container in which the curing process is to be carried out. The airflow direction can be known before printing as it can be controlled within the container and may at least be partly based on the position of the source of the airflow. The airflow may be provided by an airflow generator, such as a fan, or other source which may generate the airflow within the container or at least part of the container. In an example, the fan could be offset with the airflow being directed by a duct such that the duct is the source of the airflow in the container. The container may be the build chamber in which the 3D printer generates the 3D object or some other separate container which receives the contents of the build chamber and in which the curing process takes place. The sacrificial printable part creates a further printed area to the object to be printed such that airflow effects on the object to be printed are alleviated.

FIG. 1 shows an example method 100 for generating object model data relating to a 3D model of an object and an additional object to be printed. In this example, object model data relating to a three-dimensional object to be printed in a build chamber by a three-dimensional printer is obtained at 101. For example, a pre-print application may receive object model data representing a set of objects to be 3D printed, or this data may be received by a 3D printer.

At 102, a determination is made whether the object will likely be deformed during a curing process performed on the contents of the build chamber, wherein the curing process comprises heating of the contents of the build chamber and generating a gas flow to remove binder agent vapour. In an example, the gas flow is airflow.

After 3D printing has been completed the contents of the build chamber includes a build bed comprising at least one object that has been printed, binder agent used to define the object, and powder surrounding the object. The binder agent may be a liquid, and it may contain one or many solvents that help the agent be ink-jetted from a printhead in a 3D printer. After printing is complete, the curing process may be carried out in which the contents of the build chamber is heated to cure any binder agent present in the build bed. The curing process activates components within the binder agent, such as latex particles, to bind powder particles in a matrix. During the curing process the heat evaporates liquid components of the binder agent and gas flow such as an airflow applied through the bed in a direction helps remove print agent solvent vapour. The resulting object after curing may be referred to as a green part.

The determination of whether the object is likely to be deformed is based on whether the solvent removal gas flow used in the curing process will cause the deformation and may be based on the shape, structure, and/or position of the object within the build bed relative to the direction of the gas flow. In an example, if the gas flow is to pass from the top of the build bed to the bottom of the build bed, and part of the object has a cantilever section at the top of the build bed with the underside of the part of the object including set of layers of powder on which no binder agent has been applied, the part of the object will likely be deformed due to the application of the gas flow.

At 103, if the determination is affirmative, the method includes generating updated object model data including an additional object to be printed in proximity to the object, the additional object to prevent deformation of the object due to the gas flow applied during the curing process. The direction of the gas flow may be taken into account to determine characteristics such as the position or design of the additional object. The design of the additional object may include the size, structure, and/or shape. The updated object model data may comprise properties of the additional object, such as its dimensions and/or position and/or CAD model data. In some examples, a plurality of additional objects may be generated and positioned in proximity to the object depending on the structural properties of the object.

Using the above-mentioned example of the gas flow in a direction from the top of the build bed to the bottom of the build bed, and part of the object having a cantilever section at the top of the build bed with the underside of the part of the object including set of layers of powder on which no binder agent has been applied, an additional object may be automatically generated by the pre-printing application in a position proximal to the cantilever section and under the cantilever section. In this example, a geometrical analysis is carried out to check for cantilevers or relatively weak structural parts of the object which do not have other parts of the object supporting the part of the object compared to the direction of the gas flow. Such relatively weak structural parts may have a relatively long length. The additional objects can serve to pre-compact powder below an object so it is less affected by compaction caused by the airflow.

In another example, the determination of whether the intended object will likely be deformed during a curing process of the three-dimensional object, includes using a finite element analysis process (described in more detail below) in the pre-processing application that takes a coarse discretization of the build bed containing the intended object to be printed and applies a stiffness characteristic of the build material to different areas of the object model data to determine information relating to the deformations in the intended object and applying sacrificial objects in the appropriate positions in the build bed. Two types of stiffness characteristic such as bulk stiffness or uncured part stiffness may be applied to the build bed—the bulk stiffness applying to unprinted powder and uncured part stiffness applying to a printed powder that represents part of the object to be printed. A characterisation technique may be carried out on the uncured part in order to determine the elasticity of the part which may be represented as a stiffness parameter. A comparison to a threshold may then be made to characterise whether it is likely that the part will be deformed. In an example, the characterisation technique may be a 3-point bend test. A sacrificial part may then be created iteratively on the layers beneath a part of the intended object that is predicted to be deformed on the basis that the airflow is from above the part of the object. The sacrificial part can advantageously prevent the powder from beneath the part of the intended object from consolidating and avoid undesired deformation.

Once modified object model data that contains an arrangement of one or many objects including appropriate additional objects has been generated, the method may generate build data, or print data, which may be used to control a 3D printer to print the objects in the generated arrangement.

Figure 2:
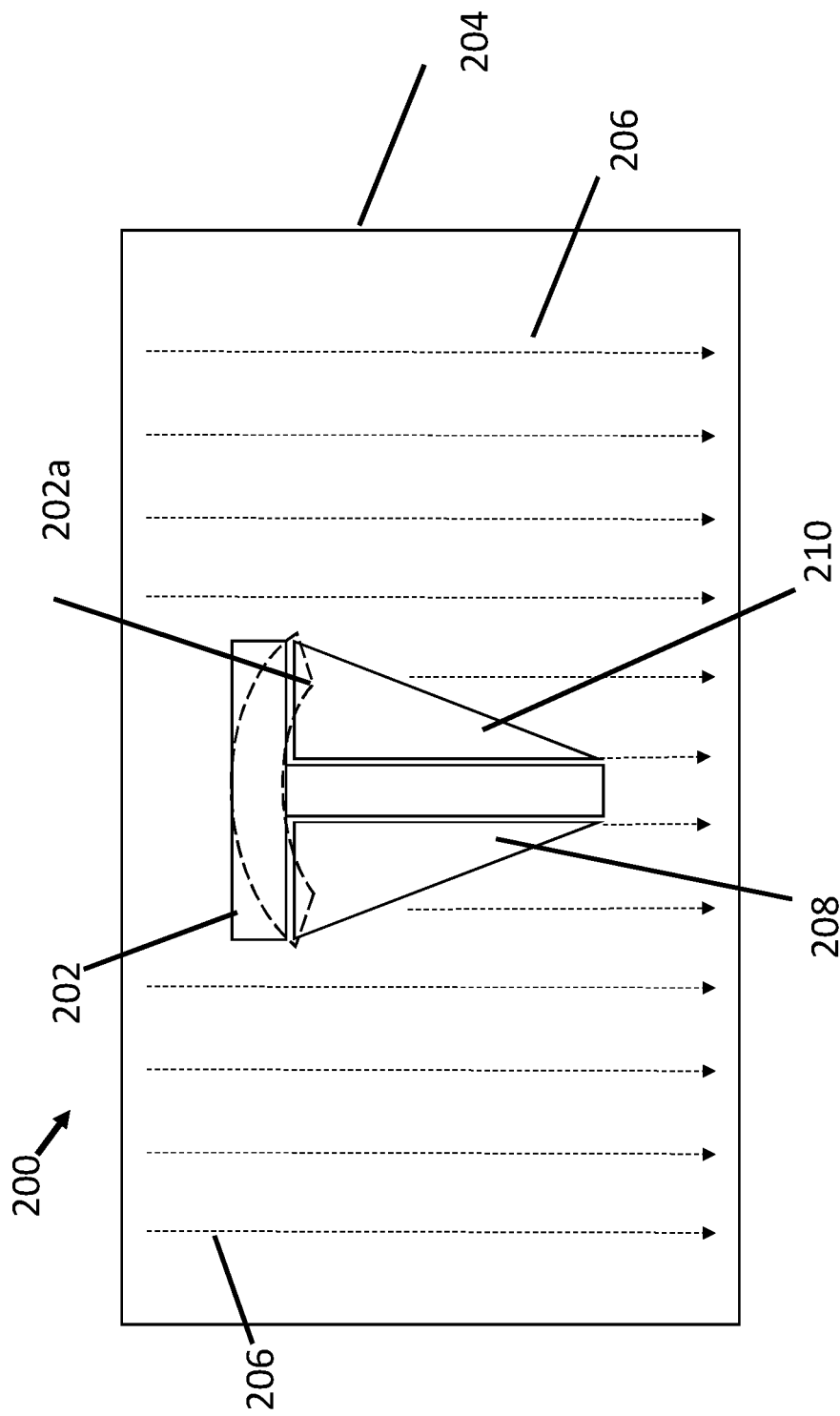
FIG. 2 is one example of an object representation in a pre-printing application including sacrificial parts that may be generated.

FIG. 2 shows an example of an object representation 200 in a pre-printing application including additional object or sacrificial parts that may be generated according to examples described herein in the pre-printing application to prevent deformation of an object. A 2D representation is shown for illustrative purposes but the object will be a 3D object to be built in a 3D printer. In this example, the object is a T-shaped part 202 to be printed. The area 204 within which the T-shaped part 202 is shown can be representative of all or part of a container within which a curing process may be carried out. Airflow that may be applied in an environment in which the curing process is carried out can be modelled in the application. The airflow is shown in the figure with multiple dashed arrows 206. In this example, the direction of the arrows is from the top of the representation to the bottom of the representation. In other examples, the airflow may be in a different direction that can be modelled in the application such that information relating to the direction of the airflow can be obtained by the pre-printing application. In other examples, the information relating to the direction of the airflow can be obtained in different ways, for example, through input of data on the direction or location data of the geometrical location of the airflow source within the area. The arrow direction is representative of the direction of the airflow. The enclosed area within which the T-shaped part 202 is shown can be representative of a container within which a curing process may be carried out.

In this first example, the top of the T-shaped part 202 may deform in the direction of the airflow 204 as shown by the dotted representation 202a if sacrificial parts are generated along with the part 202. As a result of the airflow, the surrounding powder (the non-part powder) may compact, and cause the deformation of the top of the T-shaped part as there may not be sufficient strength for it to be held in position in the build bed until the binder agent has been partially or fully cured. Any object deformation that occurs before the binder agent has been fully cured will result in a permanent deformation of the top of the T-shaped part.

In this example, to prevent deformation, sacrificial parts 208, 210 may be positioned in proximity to the T-shaped part 202. The T-shaped part has a plurality of portions and it may be determined that a portion of the object is likely to be deformed. The sacrificial parts 208, 210 may be sized and of a similar size to the portion to provide sufficient support beneath the top of the T-shaped part 202. In one example, the parts 208, 210 may be of a triangular prism geometrical shape such that the one side of the prism is located beneath the top of the T-shaped part 202. The one side of each prism-shaped sacrificial part may be of a length to match a length of one side of the top of the T-shaped part 202 that is liable to deformation. In other examples, different sizes, shapes, and/or structures of sacrificial parts may be used to prevent deformation in an intended object to be printed depending on the structural properties of the intended object.

Figure 3:
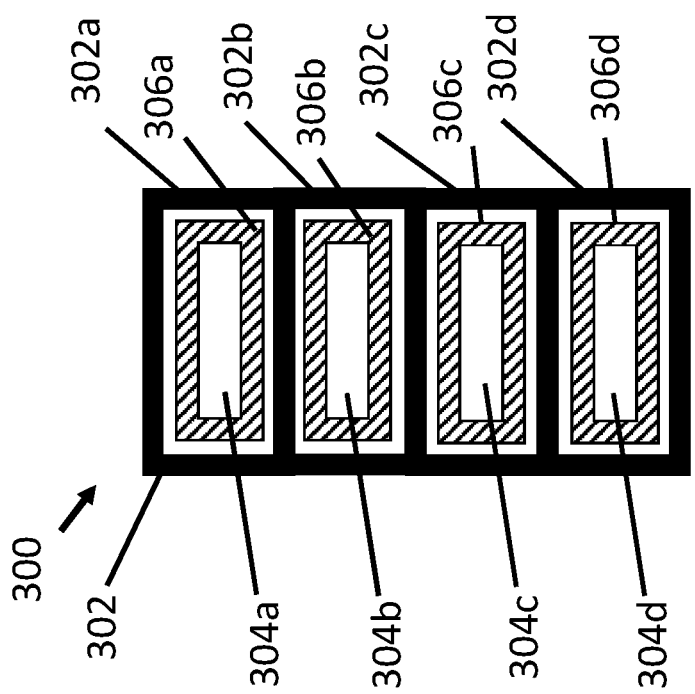
FIG. 3 is another example of an object representation in a pre-printing application including sacrificial parts that may be generated.

FIG. 3 shows another example of an object representation 300 in a pre-printing application including sacrificial parts that may be generated to prevent deformation. Similar to FIG. 2, a 2D representation is shown for illustrative purposes but the object will be a 3D object to be built in a 3D printer. In this example, the object is a shelving part 302 to be printed, the part 302 comprising a plurality of compartments. In this example, there are four compartments 302a-302d. Each compartment is of a rectangular prism shape and, once 3D printed, is intended to have a frame having solid walls to define each compartment with a hollow portion 304a-304d within each compartment 302a-302d. Similar to the example of FIG. 2, sacrificial parts may be positioned and designed to prevent deformation of the part 302 during a curing process. In this example, the intended hollow portion 304a-304d within each compartment 302a-302d is detected and it is automatically judged in the pre-printing application that areas surrounding the hollow portions may be liable to deformation if an airflow is applied within a build bed containing the part 302.

In this example, to prevent deformation, sacrificial parts 306a-306d may be positioned in proximity to potentially deformable portions of the shelving part 302. The parts 306a-306d are positioned in close proximity to an extent such that deformation of the shelving part 302 can be prevented. The sacrificial parts 306a-306d may be sized and shaped to provide sufficient support to prevent deformation within each compartment when an airflow is applied. In one example, the sacrificial parts 306a-306d may have a frame structure of a rectangular geometrical shape of a similar but smaller shape than the frame of each compartment. The frame structure of each sacrificial part 306a-306d will be arranged to be positioned within a respective hollow portion 304a-304d of each compartment 302a-302d. A frame structure, for example, a rectangular frame structure with sufficient wall thickness rather than a rectangular solid structure, has been found to have sufficient structural properties to provide a deflection of the airflow and support to the deformable object during a curing process.

In an example, in order to determine that an object will likely be deformed as a result of airflow being applied during a curing process, a geometrical analysis is performed to identify cantilever portions or other unsupported parts of the object—the unsupported parts being parts of the printed 3D object that would not be supported by another portion or section of the object once the object is 3D printed and removed from the build bed containing build powder. Such parts may be classified as potentially being deformable during a curing process.

Figure 4:
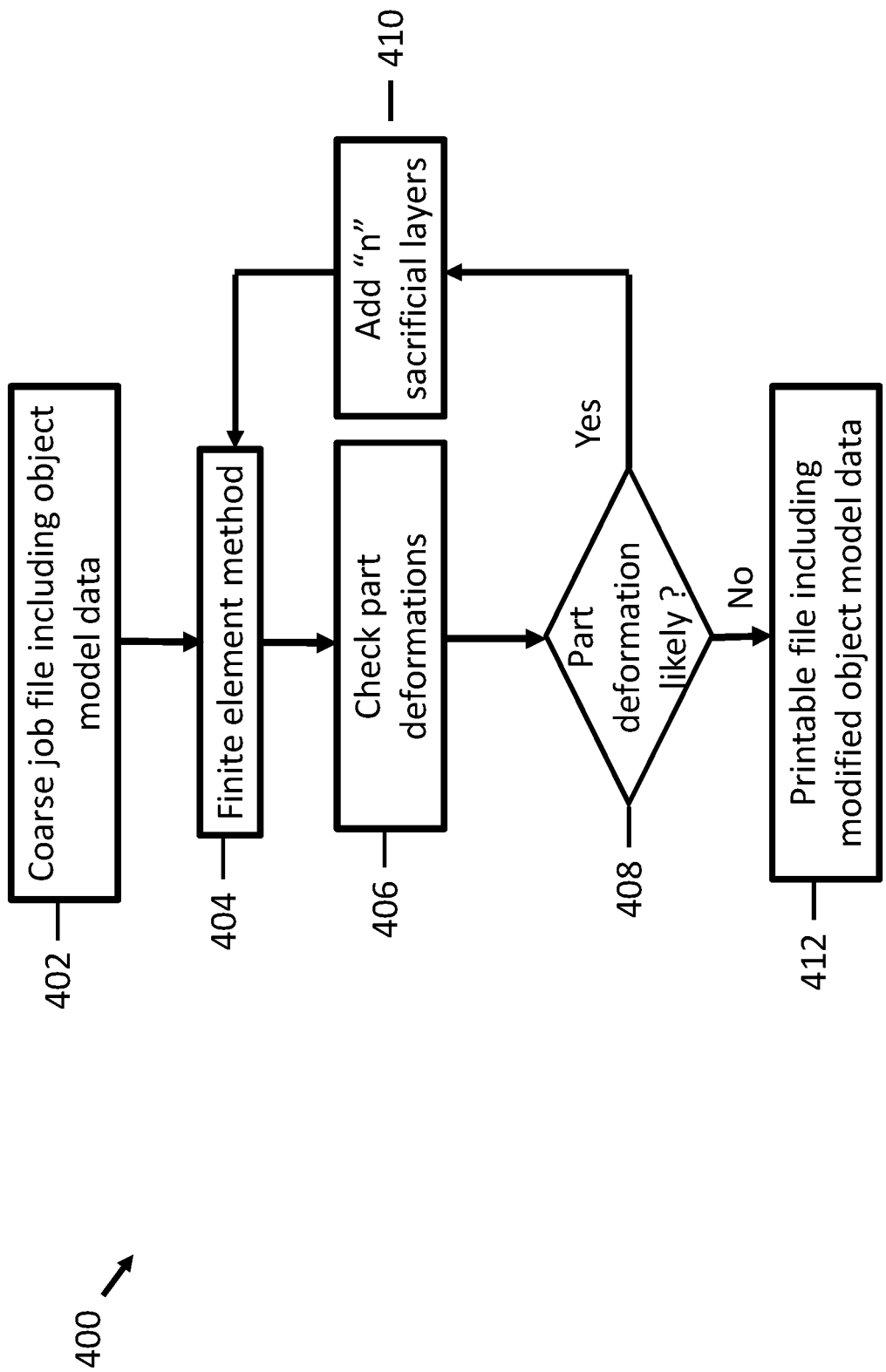
FIG. 4 is an example of a method using a finite element method to determine that an object will likely be deformed in a curing process.

In another example to determine that an object will likely be deformed as a result of airflow being applied during a curing process and referring to FIG. 4, a method 400 using a finite element method may be performed. At 402, a coarse job digital file may be obtained, the coarse job file which includes a coarse discretization of the build bed including object model data of an object to be printed. In an example, the coarse job file may be based on a representation of the build bed as shown in the example above in FIG. 2 with a T-shaped part (without the sacrificial parts). At 404, a finite element method is performed. In an example, the finite element method predicts how the object will react to forces experienced as a result of the airflow in the build bed. This can be achieved, in one example, by applying two types of stiffness to the build powder in the build bed. Two types of stiffness characteristic such as bulk stiffness or uncured part stiffness may be applied to the build bed. At 406, a part of the intended object is checked. The check may, in one example, include a determination of stresses of the part. One example technique for the determination is by determining Von Mises tensions of the part. In another example, a visual inspection of the part may be carried out to identify that a deformation may be likely. At 408, a judgement is made whether a part deformation is likely. In an example, it may be determined that if the Von Mises tension of a part is below a predetermined threshold, it is judged that that the part can be printed successfully without deformation during curing. Alternatively, if the Von Mises tension of a part is above a predetermined threshold, it is judged that the part will deform to a sufficient extent during curing such that the method causes the building of a sacrificial part. If a deformation is likely, at 410, a sacrificial part may be created iteratively as a number "N" of sacrificial layers on the layers beneath a part of the intended object that is predicted to be deformed, and the method repeats 404, 406 and 408. If the outcome of the judgement at 408 is that a part deformation is not likely, a print file including modified object model data that represents the object including the sacrificial part that is formed of the N sacrificial layers, is generated.

The print file may be supplied to a 3D printer of an additive manufacturing system. As well as containing a digital description or 3D object model of the object, the print file may contain operating instructions adapted to control an additive manufacturing device to fabricate the object using the digital description of the objects when print file is relayed to the additive manufacturing device.

The additive manufacturing system may utilise powdered build materials for the formation of 3D objects. A powdered build material may comprise powders, spheres, granules, pellets, fibres, platelets, particles of irregular shape, hollow particles, and combinations thereof. A build material may include polymeric material, metal material, ceramic material, any other suitable build material or combinations thereof.

In an example, the additive manufacturing system may utilise binder agent as described herein. The binder agent can include a binder in a liquid carrier or vehicle for application to the particulate build material. For example, the binder can be present in the binding agent at from about 1 wt % to about 50 wt %, from about 2 wt % to about 30 wt %, from about 5 wt % to about 25 wt %, from about 10 wt % to about 20 wt %, from about 7.5 wt % to about 15 wt %, from about 15 wt % to about 30 wt %, from about 20 wt % to about 30 wt %, or from about 2 wt % to about 12 wt % in the binding agent.

In one example, the binder agent can include polymer particles, such as latex polymer particles. The polymer particles can have an average particle size that can range from about 100 nm to about 1 mm. In other examples, the polymer particles can have an average particle size that can range from about 150 nm to about 300 nm, from about 200 nm to about 500 nm, or from about 250 nm to 750 nm.

In an example, the print file may include instructions to cause the additive manufacturing system to use binder agent to print the object and sacrificial part based on the modified object model data. In another example, the print file may include instructions to cause the additive manufacturing system to use binder agent to print the object and different second agent to print the sacrificial part. In such an example, the binder agent may include latex polymers whereas the different second agent for the sacrificial part may be an agent without latex. The second agent may be a wetting agent. This can prevent usage of powder for the sacrificial parts and simplify the unpacking process as the second agent would not form a stiff part after having been through the curing process.

Figure 5:
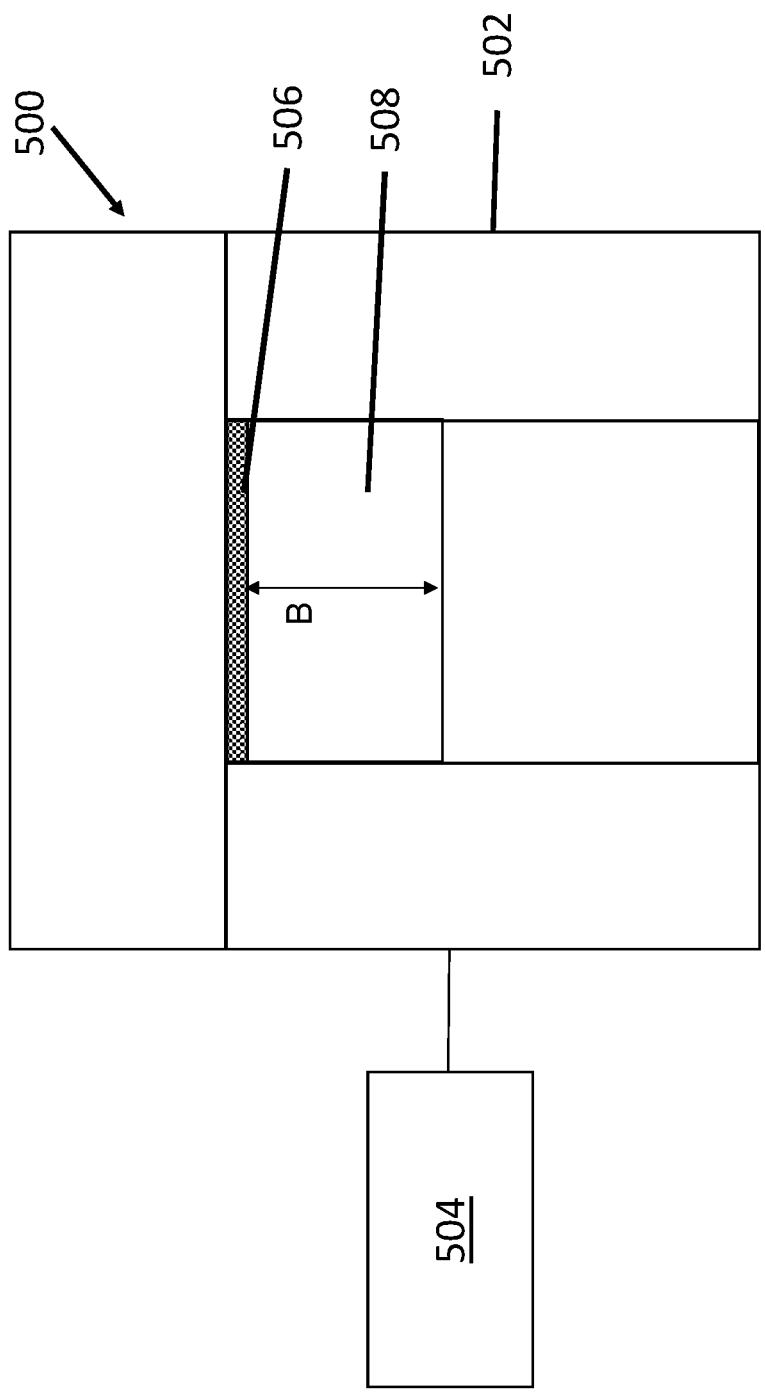
FIG. 5 is a diagram of an example portion of a build unit of an additive manufacturing system.

FIG. 5 shows one example of an additive manufacturing system 500 having a build unit 502. The additive manufacturing system 500 may receive information from a controller 504 including print data defining a printable 3D model containing at least one 3D object and at least one sacrificial part to be printed. The print data may further include instructions adapted to control an additive manufacturing device to fabricate the objects using the digital representation of the printable 3D model. During an additive manufacturing process, build material may be supplied to a build platform 506 such that the additive manufacturing process can be carried out on the build material by a 3D printing section of the additive manufacturing system. The build platform 506 may move vertically as shown by the arrow B in a build chamber 508. The build platform may move vertically downwards as layers of the build material are supplied to the build platform 506. Selective application of print agent such as fusing agent or binder agent to the build material, which in this example is a powder, but in other examples may comprise short fibres or granules, for example, may be performed to form layers of the print job. In this manner, it is possible to build the job layer by layer as the build platform is moved downwards. In this example, the print job may be based on the updated or modified model data generated in accordance with any of the examples described above. The resulting product from this printing process may therefore be the arrangement of objects determined in accordance with any of the examples described above.

Figure 6:
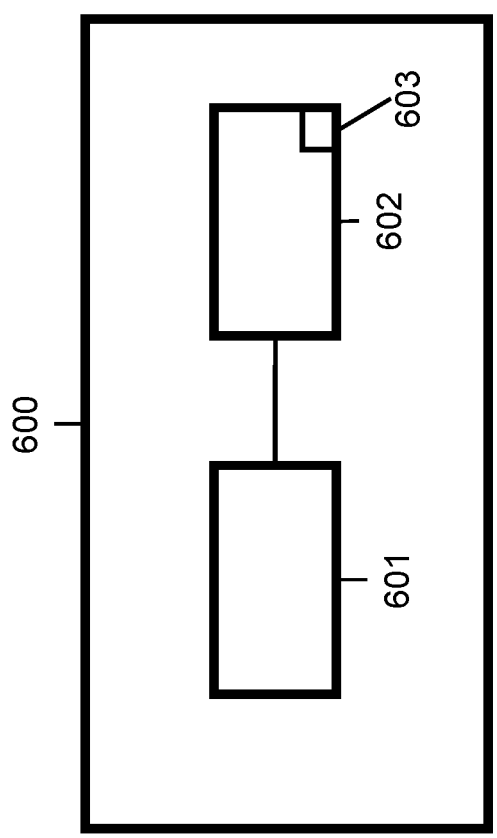
FIG. 6 is an example controller for generating a modified three-dimensional model including a sacrificial green part.

FIG. 6 shows an example of a controller 600 to generate a digital representation of one or many objects to be printed in accordance with any of the examples described above, and providing operating instructions adapted to control an additive manufacturing device to fabricate the objects using the digital representation of the objects when the instructions are relayed to the additive manufacturing device. The controller 600 comprises a processor 601 and a memory 602. Stored within the memory 602 are instructions 603 for generating object model data defining an arrangement of a set of objects and one or many sacrificial parts in accordance with any of the examples described above. In an example, the instructions 603 cause the controller to obtain a three-dimensional model of an intended three-dimensional object to be generated in a build bed through the selective application of print agent by a three-dimensional printer, the intended object comprising a green part. The instructions 603 may cause the controller to obtain deformation data to indicate that the green part will likely be deformed during a curing process of the build bed, the curing process to include the application of airflow to the three-dimensional object in order to remove print agent solvent vapour and the deformation data including the direction of the airflow. Further, the instructions may cause the controller to automatically generate a modified three-dimensional model based on the deformation data, wherein the modified three-dimensional model includes an additional green part to be printed adjacent to the green part of the intended object, the additional green part to reduce the likelihood of the green part of the intended object being deformed during the curing process. In one example, the controller 600 may be part of a computer running the instructions 603. In another example, the controller 600 may be part of a 3D printer which may be used to run the instructions 603 after obtaining object model data.

Figure 7:
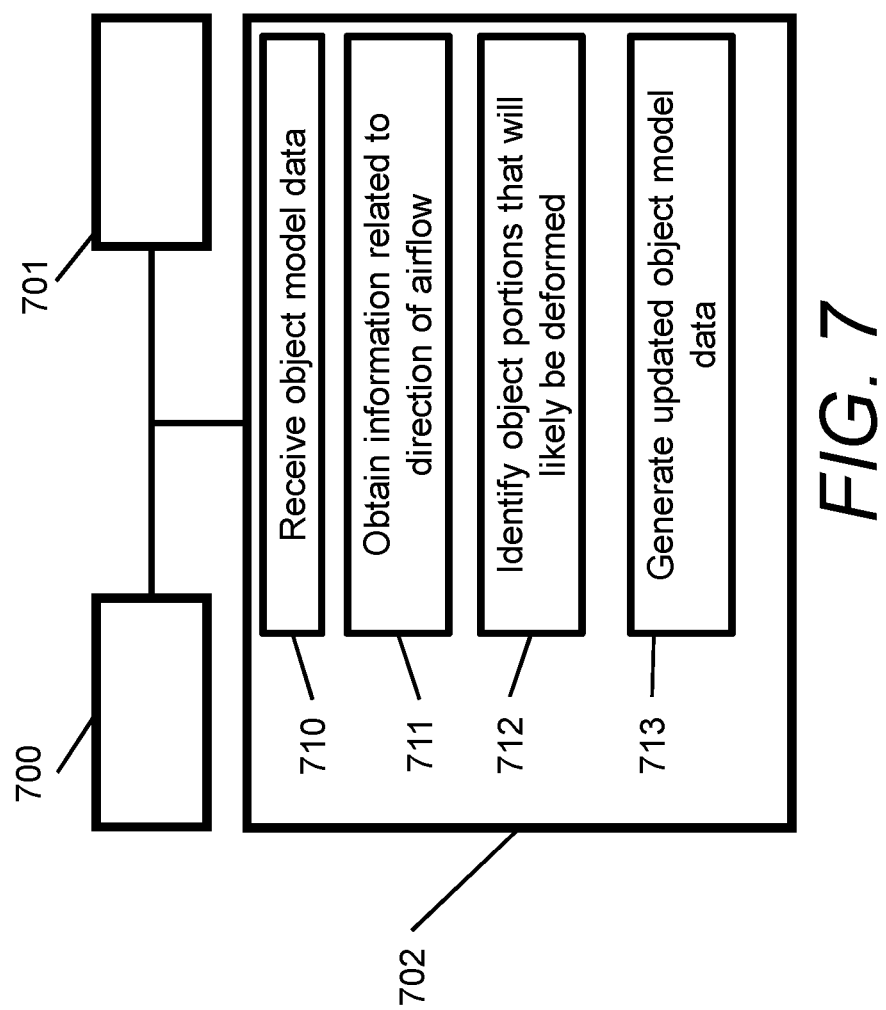
FIG. 7 is an example of a computer readable medium comprising instructions for generating updated object model data including a sacrificial part.

FIG. 7 shows a memory 702, which is an example of a computer readable medium storing instructions 710, 711 and 712 that, when executed by a processor 700 communicably coupled to an additive manufacturing system, in this case a 3D printer 701, cause the processor 700 to generate modified object model data, in accordance with any of the examples described above. At 710, object model data relating to relating to an intended object to be printed by a three-dimensional printer is received, the object to be printed in a build bed. At 711, information relating to a direction of airflow to be applied through the build bed during a curing process is obtained. At 712, portions of the intended object that will likely be deformed during a curing process whilst the three-dimensional object is positioned in the build bed is identified. At 713, updated object model data is generated, including a sacrificial object part to be printed at a position relative to the identified portions of the intended object based on the obtained information relating to the direction of the airflow and the identified portions, the sacrificial object part to provide mechanical support to the intended printable part during the curing process, The computer readable medium 703 may be any form of storage device capable of storing executable instructions, such as a non-transient computer readable medium, for example Random Access Memory (RAM), Electrically-Erasable Programmable Read-Only Memory (EEPROM), a storage drive, an optical disc, or the like.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A method comprising:
    obtaining, by a processor, object model data relating to a three-dimensional object to be generated in a build chamber through selective application of a binder agent by a three-dimensional printer;
    determining, by the processor, whether the object will likely be deformed during a curing process performed on contents of the build chamber, wherein the curing process comprises heating of the contents of the build chamber and generating a gas flow to remove binder agent vapor; and
    obtaining, by the processor, information relating to a direction of the gas flow;
    in response to determining that the object will likely be deformed during the curing process, generating, by the processor, updated object model data including an additional object to be printed in proximity to the object,
    wherein the additional object is to prevent deformation of the object during the curing process, and is designed and positioned at least in part on the basis of the information relating to the direction of the gas flow.

2. The method of claim 1, further comprising:
    causing, by the processor, the three-dimensional printer to generate the object and the additional object in accordance with the updated object model data; and
    causing, by the processor, performance of the curing process on the contents of the build chamber.

3. The method of claim 1, wherein determining whether the object will likely be deformed during the curing process includes determining whether part of a structure of the object is of a shape or in a position in the build chamber that may be subject to deformation when an airflow is applied to the contents of the build chamber.

4. The method of claim 1, wherein determining whether the object will likely be deformed during the curing process includes using a finite element analysis process that applies a stiffness characteristic to different areas of the object model data to determine deformations that may occur in the object during the curing process.

5. The method of claim 1, wherein the additional object is located proximal a cantilever portion of the object.

6. The method of claim 1, wherein the object includes a frame section and the additional object is positioned within the frame section of the object.

7. The method of claim 1, wherein the additional object has a frame structure.

8. The method of claim 1, wherein the object comprises a plurality of portions, it is determined that a portion of the object is likely to be deformed, and the additional object is of a similar size to a portion of the object that is likely to be deformed.

9. The method of claim 1, wherein there are a plurality of additional objects that are positioned in proximity to the object.

10. An additive manufacturing system comprising:
    a processor; and
    a memory storing instructions executable by the processor to perform processing comprising:
        obtaining object model data relating to a three-dimensional model of an intended three-dimensional object to be generated in a build bed through selective application of print agent by a three-dimensional printer,
        obtaining deformation data to indicate that the intended object will likely be deformed during a curing process of the build bed, the curing process to include application of airflow to the intended three-dimensional object to remove print agent solvent vapor, and the deformation data including a direction of the airflow; and
        automatically generating modified object model data that includes a modified three-dimensional model based on the deformation data, wherein the modified three-dimensional model includes an additional object to be printed adjacent to the intended object,
    wherein the additional object is to reduce a likelihood of the intended object being deformed during the curing process, and is to designed or positioned at least in part on the basis of the direction of the airflow.

11. The additive manufacturing system of claim 10, wherein the processing further comprises:
    causing generation of the object and the additional object in accordance with the modified object model data; and
    causing performance of the curing process of the build bed.

12. The additive manufacturing system of claim 10, further comprising:
    a print agent distributor to print a first print agent of a first material and second different print agent of a different material, the first print agent to be printed in relation to the object and the second print agent to be printed in relation to the additional object.

13. The additive manufacturing system of claim 10, wherein the additional object to be printed has a frame structure.

14. The additive manufacturing system of claim 10, wherein the processing further comprises:
    causing a three-dimensional printer to print the intended object and the additional object based on the modified object model data.

15. A non-transitory computer-readable medium storing instructions executable by a processor to perform processing comprising:
    receiving object model data relating to an intended object to be printed by a three-dimensional printer in a build bed;

obtaining information relating to a direction of airflow to be applied through the build bed during a curing process;

identifying portions of the intended object that will likely be deformed during a curing process whilst the three-dimensional object is positioned in the build bed; and generating updated object model data including a sacrificial object part to be printed at a position relative to the identified portions of the intended object based on the obtained information relating to the direction of the airflow and the identified portions, wherein the sacrificial object part to provide mechanical support to the intended object during the curing process.

16. The non-transitory computer-readable medium of claim 15, wherein the processing further comprises:

causing the three-dimensional printer to generate the intended object and the sacrificial object part in accordance with the updated object model data.

17. The non-transitory computer-readable medium of claim 16, wherein the processing further comprises:

causing performance of the curing process.

\* \* \* \* \*